United States Patent [19]
Schmitt

[11] Patent Number: 5,401,097
[45] Date of Patent: Mar. 28, 1995

[54] DRIVE-SLIP CONTROL SYSTEM

[75] Inventor: Johannes Schmitt, Markgroeningen, Germany

[73] Assignee: Robert Bosch GmbH, Stuttgart, Germany

[21] Appl. No.: 221,181

[22] Filed: Mar. 31, 1994

[30] Foreign Application Priority Data

Apr. 3, 1993 [DE] Germany .................. 43 11 076.2

[51] Int. Cl.⁶ .................. B60T 8/32; B60K 28/16
[52] U.S. Cl. .................. 303/100; 180/197; 303/103; 364/426.03; 188/181 C
[58] Field of Search ............ 180/197; 303/105, 110, 303/102, 103, 113.2, 113.3, 100, 107, 106, 108, 109, 93; 364/426.03, 426.02, 426.01; 188/181 C, 181 A

[56] References Cited

U.S. PATENT DOCUMENTS 4,950,037  8/1990  Kopper et al. .................. 303/110
5,116,108  5/1992  Sigl et al. .................. 303/103

FOREIGN PATENT DOCUMENTS 4123783  1/1993  Germany .

*Primary Examiner*—Douglas C. Butler
*Attorney, Agent, or Firm*—Felfe & Lynch

[57] ABSTRACT

A pressure build-up pulse is provided at the brake of a driven wheel each time slippage of the driven wheel exceeds one of a series of successively larger threshold values. Build-up pulses continue until the slippage falls below the last threshold value exceeded, and pressure reduction pluses are effected each time the slippage falls below a succeeding smaller threshold value. If the slippage does not fall below the last exceeded threshold value by a given time, a build-up pulse is initiated even if the next higher threshold value is not exceeded.

7 Claims, 2 Drawing Sheets

DRIVE-SLIP CONTROL SYSTEM

BACKGROUND OF THE INVENTION

The present invention relates to a drive slip control system in which the driven wheels of a motor vehicle are braked when they tend to spin, for which purpose the brake pressure is fed in by build-up pulses through control valves. Such a drive slip control system is disclosed in DE 41 23 783.

SUMMARY OF THE INVENTION

According to the invention, the deviation of the speed of each driven wheel from a reference speed is compared to a plurality of successively larger threshold values, and a pressure build-up pulse is supplied to the brake of the corresponding driven wheel each time the deviation exceeds a threshold.

The control quality and the comfort of the system are improved by the configuration according to the invention of the drive-slip control system. The system reacts less strongly to wheel vibrations.

BRIEF DESCRIPTION OF THE DRAWINGS

FIG. 1b is a detailed diagram of the comparator of FIG. 1a;

DETAILED DESCRIPTION OF THE PREFERRED EMBODIMENT

Figure 1A:
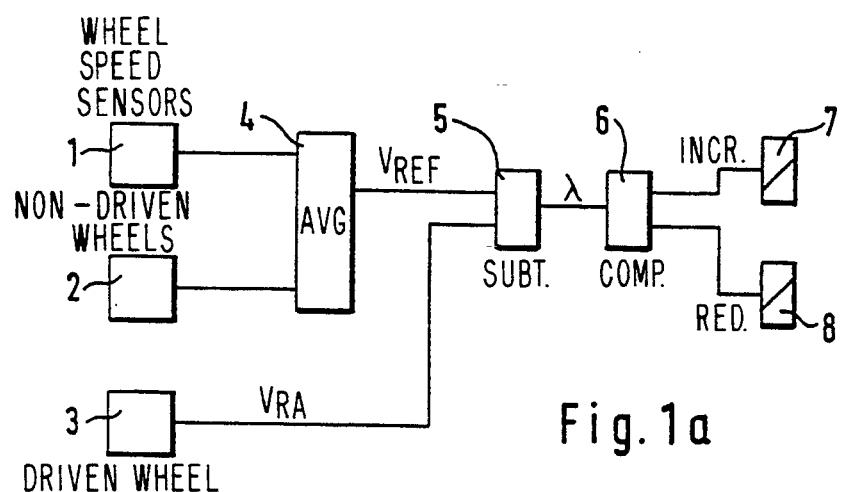
FIG. 1a is a block diagram of the system.
Figure 2:
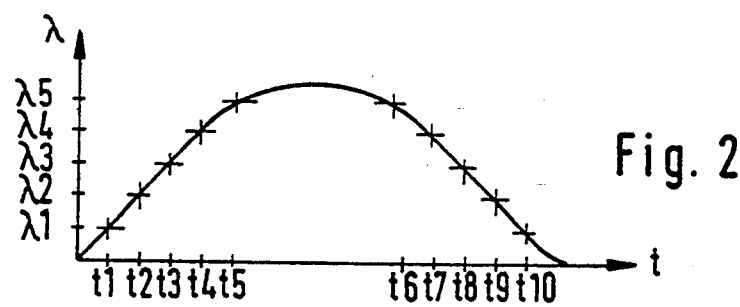
FIG. 2 is a plot of control deviation versus time for the system of FIGS. 1a, 1b, and 1c.

A block circuit is shown in FIG. 1a. It has rotational speed pick-ups 1 and 2 for the non-driven wheels and, for simplicity, only one rotational speed pick-up 3 for a driven wheel. The average speed of the non-driven wheels is determined in a block 4 ($V_{Ref}$). The average value $V_{Ref}$ is used as the reference quantity in the formation of the control deviation $\lambda = V_{RA} - V_{Ref}$, which is carried out in a subtractor 5. Here $V_{RA}$ is the speed of the driven wheel; a further subtractor (not shown) forms the control deviation for the other driven wheel. The control deviation $\lambda$ is compared with successively larger threshold values $\lambda_1, \lambda_2, \ldots \lambda_n$ in a comparator 6. A possible curve of the control deviation is plotted in FIG. 2 and five threshold values $\lambda_1$ to $\lambda_5$ are plotted. Whenever a threshold value is exceeded (at the instants $t_1$ to $t_5$), a pulse is initiated which is supplied to a valve 7 which initiates a pressure pulse. When the deviation falls below a threshold value $\lambda_1$ to $\lambda_4$, on the other hand, a pulse is initiated on the conductor leading to a reduction valve 8 and a pulsed reduction in pressure is effected ($t_7$ to $t_{10}$). No pulse is initiated when the deviation falls below the last threshold value $\lambda_5$ exceeded after a pressure build-up ($t_6$).

Figure 1B:
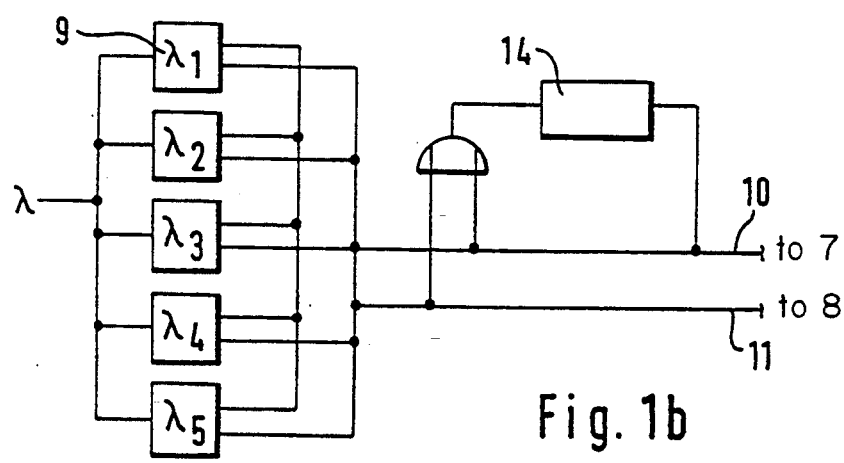
Figure 1C:
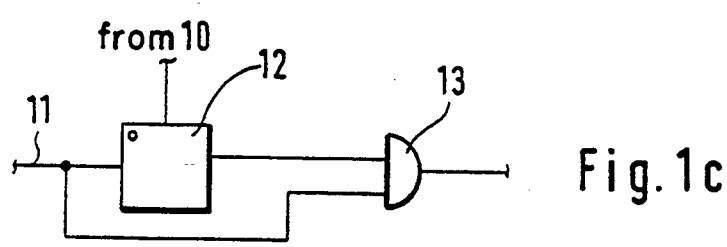
FIG. 1c is a diagram of a bistable element in the output to the pressure reducing valve.

Realization possibilities are shown in FIGS. 1b and 1c. The blocks 9 in FIG. 1b represent comparators with the specified threshold values $\lambda_1$ to $\lambda_5$ and each of these supplies a pulse to the conductor 11 when the deviation falls below a threshold value. The arrangement of FIG. 1c can be connected into the conductor 11. It has the effect that when the deviation falls below a threshold value for the first time after a pressure build-up, no pressure reduction is initiated. The first reduction pulse brings the bistable element 12 into its second position in which it makes the AND gate 13 transmit the subsequent pulses. A subsequent build-up pulse on the conductor 10 resets the bistable element.

A monostable element 14, to which the build-up and reduction pulses of the conductors 10 and 11 are supplied, is provided in order to avoid the control deviation between two threshold values persisting too long. As long as pulses arrive at an interval which is smaller than the time constant T of the monostable element 14, the element is held in its second position. If, however, the time T is exceeded, the element 14 falls back into its initial position and generates a pulse which is coupled into the conductor 10 and therefore initiates a pressure build-up pulse.

The difference between the threshold values $\lambda_1 \ldots \lambda_n$ can be variable and can be influenced by previous control cycles by the number of build-up pulses determining the interval between the threshold values. The more build-up pulses in the previous control cycle, the smaller is the difference between the threshold in the current computing cycle. This takes account of the effect of the brakes (poor braking effect leads to higher and longer control deviation). A control cycle is defined as follows: start of pressure build-up pulses from 0 bar to the end of pressure reduction pulses.

Figure 3A:
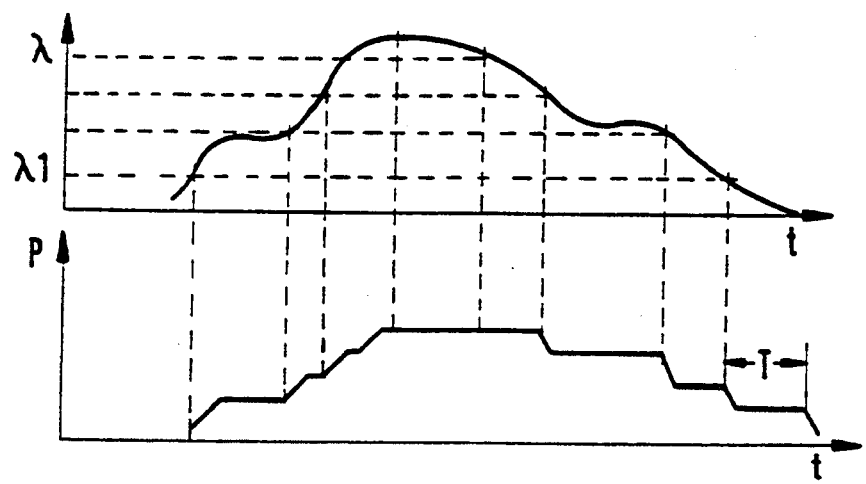
FIG. 3a shows the relationship between pressure and control deviation for a multistage pressure build-up and reduction.
Figure 3B:
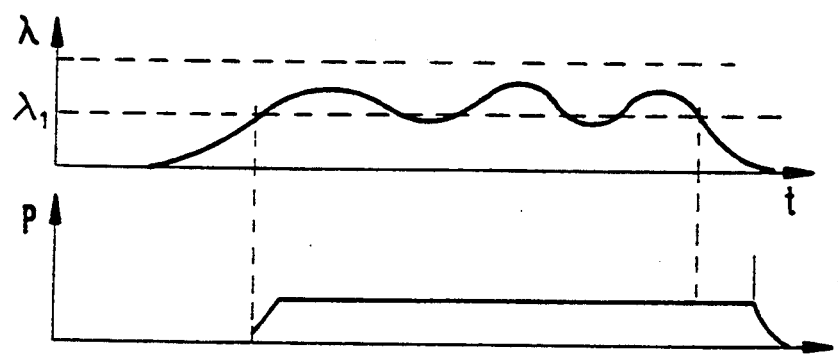
FIG. 3b shows the pressure in the case of oscillation about a threshold value $\lambda_1$.
Figure 3C:
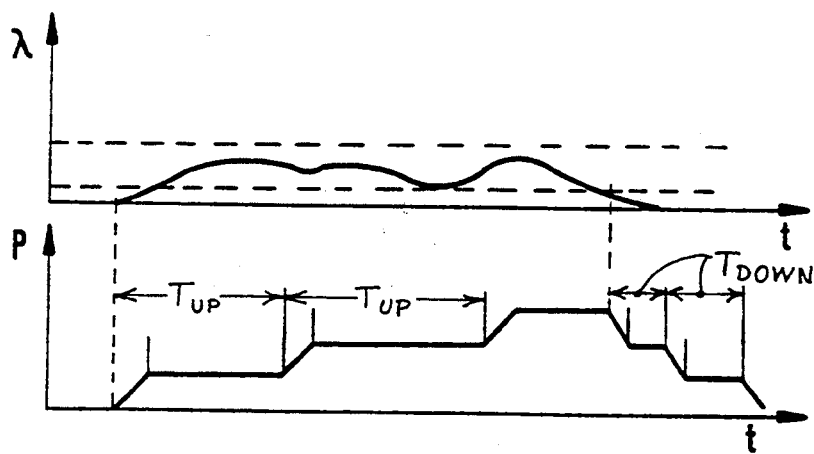
FIG. 3c shows the pressure when the control deviation between two thresholds persists for too long.

Control deviations $\lambda$ and the resulting pressure curves P are shown in FIG. 3a to 3c for three different cases. FIG. 3a shows a multi-stage pressure build-up and pressure reduction. FIG. 3b shows the pressure behaviour in the case of an oscillation around a threshold value $\lambda_1$; here a pressure reduction pulse is initiated when the deviation falls below the first threshold value for more than a specified time. FIG. 3c shows the influence on pressure when the control deviation persists between two threshold values for a longer period than $T_{Up}$. Note that the periods $T_{Up}$ are equal and the periods $T_{Down}$ are equal, but the periods $T_{Up}$ are not the same as the periods $T_{Down}$.

I claim:

1. Drive slip control system for a vehicle having brakes at respective driven wheels, said vehicle exhibiting a vehicle speed, said wheels exhibiting respective wheel speeds, said system comprising
    means for determining a reference speed which approximates the vehicle speed,
    means for determining the speed of each driven wheel,
    pressure increase valve means at the brake of each driven wheel,
    pressure reduction valve means at the brake of each driven wheel,
    means for determining a deviation of the speed of each driven wheel from the reference speed,
    means for comparing said deviation to a plurality of successively larger deviation threshold values beginning with a first deviation threshold value, and
    means for supplying a pressure build-up pulse to the pressure increase valve means of a driven wheel each time the deviation for said driven wheel exceeds one of said threshold values.

2. Drive slip control system as in claim 1 further comprising means for supplying a pressure reduction pulse to the pressure reduction valve means for a driven wheel when the deviation for said driven wheel falls below one of said threshold values.

3. Drive slip control system as in claim 2 wherein said means for supplying a pressure reduction pulse does not supply a pressure reduction pulse when said deviation falls below a threshold value which initiated an immediately preceding build-up pulse.

4. Drive slip control system as in claim 1 wherein said means for supplying a pressure build-up pulse supplies a build-up pulse when the time since reaching an immediately preceding threshold value exceeds a predetermined time without reaching any further threshold value.

5. Drive slip control system as in claim 2 wherein at least one pressure build-up pulse is followed by at least one pressure reduction pulse until the pressure reaches zero, the build-up and reduction pulses until the pressure reaches zero constituting a control cycle, adjacent threshold values in a control cycle having differences which are dependent on the number of build-up pulses in a previous control cycle.

6. Drive slip control system as in claim 2 wherein a pressure reduction pulse is supplied to said pressure reduction valve means when said deviation falls below said first threshold value for more than a specified time.

7. Drive slip control system as in claim 6 wherein at least one pressure build-up pulse is followed by at least one pressure reduction pulse until the pressure reaches zero, the build-up and reduction pulses until the pressure reaches zero constituting a control cycle, said specified time being dependent on the duration of the control deviation in a previous cycle.

* * * * *